United States Patent [19]
Benage et al.

[11] Patent Number: 6,136,951
[45] Date of Patent: Oct. 24, 2000

[54] TEST METHOD FOR EVALUATING INSOLUBLE POLYMER GROWTH

[75] Inventors: Brigitte Benage, Wolcott; Brendan J. Geelan, East Haven; Gerald J. Abruscato, Southington, all of Conn.

[73] Assignee: Uniroyal Chemical Company, Inc., Middlebury, Conn.

[21] Appl. No.: 09/374,955

[22] Filed: Aug. 16, 1999

[51] Int. Cl.$^7$ .................................................. C08F 6/00
[52] U.S. Cl. ................... 528/501; 528/502 A; 528/502 C
[58] Field of Search ................................ 528/501, 502 A, 528/502 C

[56] References Cited

U.S. PATENT DOCUMENTS

| | | | |
|---|---|---|---|
| 4,774,374 | 9/1988 | Abruscato et al. | 585/24 |
| 4,915,873 | 4/1990 | Abruscato et al. | 252/402 |
| 5,312,952 | 5/1994 | Grossi et al. | 558/46 |
| 5,540,861 | 7/1996 | Grossi et al. | 252/404 |

OTHER PUBLICATIONS

Ivan, Macromol. Symp. 88:201–215 (1994).
Shigemoto et al., Macromol. Rapid Commun. 17:347–351 (1996).
Greszta et al., Macromolecules 29:7661–7670 (1996).

*Primary Examiner*—Duc Truong
*Attorney, Agent, or Firm*—Raymond D. Thompson; Paul Grandinetti

[57] ABSTRACT

A method for evaluating the polymer growth inhibition ability of a compound or compounds is disclosed wherein the method comprises:

A) weighing a dry seed of insoluble polymer capable of growing via a living polymerization mechanism;

B) subjecting the seed of insoluble polymer to conditions capable of causing a living polymer to grow via a living polymerization mechanism;

C) drying the seed; and

D) weighing the seed a second time to determine any increase in weight;

wherein the polymer growth inhibition ability of the compound or compounds is inversely proportional to any increase found in weight of the seed.

12 Claims, No Drawings

TEST METHOD FOR EVALUATING INSOLUBLE POLYMER GROWTH

BACKGROUND OF THE INVENTION

1. Field of the Invention

The present invention is directed to a test method for evaluating the effectiveness of various compounds in their ability to prevent polymer growth via a "living" polymerization mechanism when the "living" polymer is insoluble in the monomer stream.

2. Description of Related Art

Many ethylenically unsaturated monomers undesirably polymerize at various stages of their manufacture, processing, handling, storage, and use. Polymerization, such as thermal polymerization, during their purification results in the loss of the monomer, i.e., a lower yield, and an increase in the viscosity of any tars that may be produced. The processing and handling of the higher viscosity tars then requires higher temperature and work (energy cost) to remove residual monomer.

Polymerization can also result in equipment fouling, especially in the case of production of acrylic monomers. Such polymerization causes loss in production efficiency owing to the deposition of polymer in or on the equipment being used. These deposits must be removed from time to time, leading to additional loss in production of the monomer.

A wide variety of compounds has been proposed and used for inhibiting uncontrolled and undesired polymerization of ethylenically unsaturated monomers. However, many of these compounds have not been fully satisfactory. Accordingly, there has been a continuing need in the art for a testing means by which compositions intended for use as monomer polymerization inhibitors can be evaluated.

There are several mechanisms by which polymerization inhibitors work. One mode of action for polymerization inhibitors is for the inhibiting species to combine with the propagating polymer chain such that the polymerization of that polymer chain stops, i.e., a termination reaction. If such an inhibitor-terminated polymer chain is capable of participating in a dynamic equilibrium between a dormant species (the inhibitor-terminated chain) and an active polymer chain, it would be considered a "living" or quasiliving polymer. For example, Ivan, *Macromol Symp.* 88:201–215 (1994) describes quasiliving polymerization as a polymerization in which ". . . only a portion of chain ends are active (propagating) and these are in equilibria with inactive (dormant, nonpropagating) chains . . . " Shigemoto et al., *Macromol. Rapid Commun.* 17:347–351 (1996) state, "Well-defined polymers can be prepared by controlled/"living" radical polymerization in the presence of relatively stable radicals. These systems employ the principle of dynamic equilibration between dormant species and growing radicals via reversible homolytic cleavage of a covalent bond in dormant species." Further, Greszta et al., *Macromolecules* 29:7661–7670 (1996) state, "The reversible homolytic cleavage of dormant species can be accomplished by either thermal, photochemical, or catalytic activation. The most successful approaches are as follows: homolytic cleavage of alkoxyamines and dithiocarbamates, use of various organo-metallic species, and catalyzed atom transfer radical polymerization." Such a "living" polymer is capable of increasing in molecular weight (growing) through its reaction with additional monomer units of the same or different types of polymerizable monomers.

The method by which this "living" polymer grows is termed the "living" polymerization mechanism, and is depicted below.

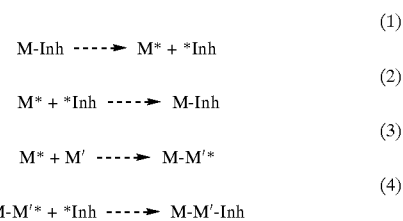

Reactions (1) and (2) depict the dynamic equilibrium, with (2) being the termination reaction. Reaction (3) depicts growth of the polymer chain. Reaction (4) depicts re-termination of the growing polymer chain with the inhibiting species. The amount of growth over any period of time is dependent on the relative rate at which (2) occurs versus (3), as long as (1) occurs to some extent. The faster (2) is relative to (3), the more time is needed for significant growth of the polymer. Under the conditions in which inhibitors are normally used, the concentration of the inhibiting species should be sufficiently high to cause reaction (2) to be much faster than reaction (3), otherwise it would not be an effective inhibiting system for commercial use. However, we have realized that even at an effective inhibiting amount of the inhibitor, growth can still occur, given sufficient time and temperature.

There are at least two scenarios in which "living" polymer can remain in a monomer purification train for an excessive amount of time.

First, the use of recycle can significantly increase the amount of time that the "living" polymer can remain in the purification train. To recycle unused inhibitor that is left in the purification stream after removal of the monomer, a portion of the residual stream is added to a feed stream earlier in the purification train. This residual stream typically contains inhibitor, small amounts of monomer, impurities in the monomer stream that have been concentrated by the purification process, and polymer formed during the production and purification process. Recycling this polymer will allow it time to grow if it is "living" polymer and the conditions of the purification train allow the "living" polymerization mechanism to occur. If this polymer grows via the "living" polymerization mechanism, excessive polymerization would cause loss in product yield, increased waste residues from the process, and potential plugging of equipment due to excessively high molecular weight polymer in the purification stream.

Second, occasionally, conditions in the plant/purification process can result in the formation of polymer within the purification train that is not dissolved by the monomer stream. If this polymer is caught in a dead space, or if it attaches to the metal on the inside of the equipment, it will not be washed out of the system. Thus, the polymer will remain within the system indefinitely (potentially for two or more years). If this polymer grows via the "living" polymerization mechanism, it could coat the inside of the equipment, causing inefficient separation of the monomer stream components and/or insufficient heating of the stream to enable purification. Such a situation would cause loss in product yield and could potentially cause an unscheduled shut-down of the plant in order to clean out the undissolved polymer in the equipment. Such a shut-down results in loss of monomer production and additional expense to clean out and dispose of the undissolved polymer.

SUMMARY OF THE INVENTION

Given the potential loss in monomer yield as well as loss in monomer production and the additional economic drawbacks due to increased waste residues and cleaning of plugged equipment, a test method has now been developed to evaluate the effectiveness of various compounds in their ability to prevent polymer growth via a "living" polymerization mechanism when the "living" polymer is not dissolved in the monomer stream.

More particularly, the present invention is directed to a method for evaluating the polymer growth inhibition ability of a compound or compounds comprising:

A) weighing a dry seed of insoluble polymer capable of growing via a living polymerization mechanism;

B) subjecting the seed of insoluble polymer to conditions capable of causing a living polymer to grow via a living polymerization mechanism;

C) drying the seed; and

D) weighing the seed a second time to determine any increase in weight;

wherein the polymer growth inhibition ability of the compound or compounds is inversely proportional to any increase found in weight of the seed.

DESCRIPTION OF THE PREFERRED EMBODIMENTS

As stated above, the present invention is directed to a method for evaluating the polymer growth inhibition ability of a compound or compounds comprising:

A) weighing a dry seed of insoluble polymer capable of growing via a living polymerization mechanism;

B) subjecting the seed of insoluble polymer to conditions capable of causing a living polymer to grow via a living polymerization mechanism;

C) drying the seed; and

D) weighing the seed a second time to determine any increase in weight;

wherein the polymer growth inhibition ability of the compound or compounds is inversely proportional to any increase found in weight of the seed.

The present invention thus comprises subjecting a seed of insoluble polymer capable of growing via the "living" polymerization mechanism to a test method capable of evaluating the polymerization inhibition ability of a compound or blend of compounds under test conditions capable of causing the "living" polymer to grow via the "living" polymerization mechanism. Such test methods can include, but are not limited to, static tests, dynamic tests, small scale simulations of a distillation column and/or reboiler, and pilot units for a distillation train. The dry seed of insoluble polymer is weighed before the test. After subjection to the test conditions, the seed is dried (i.e., solvent is removed). Drying methods can include, but are not limited to, separating the insoluble polymer seed from the test solution by filtering, if necessary, and removing remaining traces of solvent by either leaving the insoluble polymer seed exposed to the air overnight and/or subjecting it to evaporation under reduced pressure (such as on a rotary evaporator or in a vacuum oven). The newly dried insoluble polymer seed is then weighed again. An increase in weight of the insoluble polymer seed is an indication of polymer growth via a "living" polymerization mechanism. The greater the increase in weight, the poorer the growth-inhibiting ability of the inhibiting system tested. Illustrations of this method are described below.

Procedure for Polymer Growth Reboiler Test

Preparation of Feed Solution:

Tert-butylcatechol (TBC) is removed from commercially available styrene by distillation under vacuum. Removal of TBC is verified by caustic titration. The desired amount of inhibitor(s) is added to this TBC-free styrene either directly or by first making a concentrated solution of the inhibitor in TBC-free styrene followed by further dilution with TBC-free styrene.

Procedure for Polymer Growth Dynamic Reboiler Test:

A quantity of the Feed Solution containing inhibitor or blend of inhibitors at the desired charge (stated as a wt/wt total inhibitor to styrene) is added to a round-bottom flask (the Pot). A known quantity of insoluble polymer is placed inside the Pot and submersed in the Feed Solution in the Pot. The insoluble polymer can be retained in the pot by any suitable means. Typically, the insoluble polymer is securely wrapped in a piece of filter paper or wire mesh and suspended by a wire within the Pot. Conversely, the Bottoms Stream line can be covered with filter paper or mesh to prevent insoluble polymer from being removed from the pot. The Pot is placed in a hot oil bath, and the Feed Solution is heated to the desired temperature (usually 130° C.) and brought to reflux by adjusting the pressure/vacuum. Once the Pot contents are at temperature, a continuous stream of fresh Feed Solution is begun at a rate that will add the volume of the initial Pot solution to the Pot over a period of time called the "residence time" (typically one hour). At the same time at which the fresh Feed Solution flow is begun, the Bottoms Stream flow is also begun. The Bottoms Stream is solution in the Pot that is removed at the same rate as the fresh Feed Solution is added. The equal flows of Feed and Bottoms Streams causes the quantity in the Pot to remain constant over the time of the experiment while allowing continuous replenishment of inhibitor. This procedure simulates the way inhibitors are used in a distillation train of a plant producing vinyl monomers. The experiment continues with flow in and out of the Pot for a specified length of time (usually 7 hours). Samples are collected hourly from the Bottoms Stream. These samples are analyzed for polymer content via the methanol turbidity method. The amount of polymer in the samples is an indication of effectiveness of the inhibitor system being tested.

After running for the specified length of time, the vacuum is released and, if used, the filter paper bag of polymer is removed. The Pot solution is filtered to recover any insoluble polymer that may have escaped from the bag. Any filtered polymer and the polymer in the filter paper bag are allowed to dry open to the atmosphere for at least 18 hours. The polymer can be further dried by placing it in a vacuum oven at 40–50° C. under full vacuum for 1–2 hours. The polymer is then weighed. Percent growth is determined by the following equation:

$$\% \text{ growth} = \frac{\text{weight of final insoluble polymer} - \text{weight of initial insoluble polymer}}{\text{weight of initial insoluble polymer}} \times 100$$

The advantages and the important features of the present invention will be more apparent from the following examples.

EXAMPLES PREPARATION OF INSOLUBLE POLYMER CAPABLE OF GROWING (Polymer A)

Tert-butylcatechol (TBC) was removed from commercially available styrene and from commercially available divinyl benzene (DVB) by distillation under vacuum. Removal of TBC was verified by caustic titration. TBC-free styrene (50 g), ethyl benzene (49 g), TBC-free DVB (1 g), and 4-oxo-TENDO (0.01 g) were combined. (As used herein, the abbreviation TEMPO stands for 2,2,6,6-tetramethyl-1-piperidinyloxy. Thus, 4-amino-TEMPO is 4-amino-2,2,6,6-tetramethyl-1-piperidinyloxy; 4-hydroxy-TEMPO is 4-hydroxy-2,2,6,6-tetramethyl-1-piperidinyloxy; and 4-oxo-TEMPO is 4-oxo-2,2,6,6-tetramethyl-1-piperidinyloxy.) The mixture was stirred at 130° C. until it polymerized to a gel (about 3 hours). The gel-like system was cooled to about 60° C., and 2 liters of ethyl benzene were added. The resulting mixture was stirred for 2 hours at 50° C., filtered by vacuum filtration until the gel was mostly dry, whereupon the remaining solvent was removed by evaporation under fill vacuum at 50° C. A hard, white polymer was obtained (25 g, 49% yield). PREPARATION OF INSOLUBLE POLYMER INCAPABLE OF GROWING (Polymer B)

Poly(styrene-co-divinyl benzene), 2% cross-linked, was obtained from Aldrich Chemical Company. Ethyl benzene (200 mL) was added to 10 g of this material. The mixture was stirred for 50 minutes at 100° C. and filtered by vacuum filtration until dry. A white powder was obtained (9.13 g, 91% recovery).

The ability of the test of the present invention to distinguish between polymer capable of growing and polymer incapable of growing is illustrated in Table 1 by Examples 1 and 5, respectively. The ability of this test to give an indication of the capability of an inhibiting system to allow or prevent polymer growth is illustrated in Table 1 by Examples 1–versus Examples 6–8, respectively.

TABLE 1

| Example | Inhibitor System (Charge versus Styrene) | Insoluble Seed Used | Growth (% inc. in weight of insoluble polymer after 7 hrs) |
|---|---|---|---|
| 1 | 4-oxo-TEMPO (300 ppm) | Polymer A (Nitroxyl-capped) | 628 |
| 2 | 4-hydroxy-TEMPO (300 ppm) | Polymer A | 736 |
| 3 | 4-amino-TEMPO (300 ppm) | Polymer A | 923 |
| 4 | Bis-(2,2,6,6-tetramethyl-piperidine-1-oxyl-4-yl) sebacate (300 ppm) | Polymer A | 1400 |
| 5 | 4-oxo-TEMPO (300 ppm) | Polymer B (Not nitroxyl-capped) | −35 |
| 6 | DNBP (1500 ppm) | Polymer A | 20 |
| 7 | DNBP/PDA (900 ppm/600 ppm) | Polymer A | 11 |
| 8 | 4-oxo-TEMPO/Diethylhydroxyl amine (300 ppm/600 ppm) | Polymer A | 76 |

PDA = N-phenyl-N'-(1,4-dimethylpentyl)-para-phenylenediamine
DNBP = 2,4-dinitro-6-sec-butylphenol In view of the many changes and modifications that can be made without departing from principles underlying the invention, reference should be made to the appended claims for an understanding of the scope of the protection to be afforded the invention.

What is claimed is:

1. A method for evaluating the polymer growth inhibition ability of a compound or compounds comprising:

A) weighing a dry seed of insoluble polymer capable of growing via a living polymerization mechanism;

B) subjecting the seed of insoluble polymer to conditions capable of causing a living polymer to grow via a living polymerization mechanism;

C) drying the seed; and

D) weighing the seed a second time to determine any increase in weight;

wherein the polymer growth inhibition ability of the compound or compounds is inversely proportional to any increase found in weight of the seed.

2. The method of claim 1 wherein the evaluation is carried out by means of a static test, a dynamic test, a small scale simulation of a distillation column and/or reboiler, or a pilot unit for a distillation train.

3. The method of claim 1 wherein the seed is dried by evaporating the solvent from the insoluble polymer seed by exposure to the air, subjecting it to evaporation under reduced pressure, or both.

4. The method of claim 3 wherein the exposure step is preceded by a filtration step.

5. The method of claim 3 wherein the step of evaporation under reduced pressure is effected by means of a rotary evaporator.

6. The method of claim 4 wherein the step of evaporation under reduced pressure is effected by means of a rotary evaporator.

7. The method of claim 3 wherein the step of evaporation under reduced pressure is effected by means of a vacuum oven.

8. The method of claim 4 wherein the step of evaporation under reduced pressure is effected by means of a vacuum oven.

9. The method of claim 1 wherein the polymer comprises an ethylenically unsaturated monomer.

10. The method of claim 9 wherein the polymer comprises polymerized styrene.

11. The method of claim 10 wherein the polymer further comprises polymerized divinyl benzene.

12. The method of claim 9 wherein the polymer comprises an acrylate monomer.

* * * * *